United States Patent

Eaddy

[15] 3,635,749

[45] Jan. 18, 1972

[54] PROCESS FOR IMPROVING ADHESION OF VINYL RESINS TO A POLYAMIDE AND RESULTANT PRODUCT

[72] Inventor: William P. Eaddy, Columbia, S.C.

[73] Assignee: Deering Milliken Research Corporation, Spartanburg, S.C.

[22] Filed: Mar. 18, 1969

[21] Appl. No.: 808,307

[52] U.S. Cl. ........................... 117/76 T, 117/47 A, 117/72, 117/138.8 N, 156/331, 161/227
[51] Int. Cl. .................. B44d 1/14, B32b 27/34, B32b 27/30
[58] Field of Search ............. 117/138.8 N, 138.8 A, 138.8 B, 117/76 T, 76 F, 47 A, 72, 161 UF; 161/227; 156/331

[56] References Cited

UNITED STATES PATENTS

| | | |
|---|---|---|
| 2,842,509 | 7/1958 | Shannon ..................... 117/138.8 N X |
| 3,297,476 | 1/1967 | Kane ............................... 117/47 R X |
| 3,361,586 | 1/1968 | Lindsey ........................ 117/161 UF X |
| 3,471,359 | 10/1969 | Goldstein ......................... 117/76 F X |
| 3,513,055 | 5/1970 | Brader et al. ..................... 117/76 P X |

*Primary Examiner*—William D. Martin
*Assistant Examiner*—Ralph Husack
*Attorney*—Norman C. Armitage and H. William Petry

[57] ABSTRACT

A process, and the resulting products, of treating polyamide structures to improve their bonding characteristics to vinyl resins wherein a surface of the polyamide structure is coated with a first coating of a polyalkylenimine compound and the coating is treated to substantially fully react the coating with the polyamide structure, and thereafter a second coating of a polyalkylenimine compound is applied thereto and dried or partially cured thereon to provide improved adhesion of the polyamide structure to a vinyl resin.

11 Claims, No Drawings

PROCESS FOR IMPROVING ADHESION OF VINYL RESINS TO A POLYAMIDE AND RESULTANT PRODUCT

This invention relates to treatment of synthetic polyamide structures to improve their bonding characteristics to vinyl resins and, more particularly, to an improved process, and the resulting products, of treating polyamide textile materials, e.g., nylon yarns and fabrics, to improve their adhesion to vinyl resins, especially in sheet or plastisol form.

In a copending commonly assigned U.S. Pat. application Ser. No. 808,309, filed Mar. 18, 1969, there is disclosed a process for treating polyamide structures to improve their bonding characteristics to vinyl resins by coating a surface of the structure with a polyalkylenimine compound and thereafter partially curing the polyalkylenimine compound on the structure before lamination or coating of the structure with the vinyl resin. Typical of such vinyl resins which are adhered in sheet or plastisol form to the polyamide structures are polymers of vinyl halides, or copolymers of vinyl halides with vinyl esters of carboxylic acids or acrylic esters. As disclosed therein, it is postulated that in a concurrent laminating and curing operation with the polyamide structure, interaction of the polyalkylenimine with the vinyl resin proceeds more rapidly than its interaction with the polyamide. This greatly reduces the reactivity of the imine at the polyamide interface and results in lower overall adhesion of the vinyl to the polyamide structure. Thus, by partially curing and reacting the polyimine with the polyamide structure, before laminating, in the absence of the vinyl resin, sufficient interaction of the polyamide and polyimine can be obtained to provide a proper balance of interaction of the imine with the polyamide and vinyl resin when the two are adhered to form the final product. The present invention is an improvement on the process disclosed in the above-mentioned application, and the disclosure of the copending patent application is intended to be incorporated herein by reference.

It is an object of the present invention to provide an improved process for treating polyamide structures, more particularly nylon textile materials in yarn or fabric form, to improve their adhesion and bonding characteristics to vinyl resins.

It is another object of this invention to provide a process for producing vinyl coated or laminated textile fabrics having improved adhesion.

It is a further object to provide a novel product produced by the above process.

The above as well as other objects of the present invention are accomplished by coating a surface of a polyamide structure, e.g., nylon yarns or fabrics, with a polyalkylenimine compound, treating the coated structure to substantially fully react the coating with the polyamide structure, thereafter applying a second coating of the polyalkylenimine compound on the coated structure, and subsequently drying or partially curing the second coating on the polyamide structure. More particularly, it has been found that if the first polyimine coating is heated at a temperature of from about 360° F. to 450° F. for about one-half to 3 minutes, and the second polyimine coating is treated by at least drying it at room temperature, the resultant doubly coated polyamide structure exhibits greatly improved adhesion to vinyl resins, especially in sheet or plastisol form.

Although the second polyalkylenimine coating may be merely dried on the first coating at ambient temperatures to provide improved adhesion, it preferably is heated under sufficient conditions to partially cure and interact the second coating with the first coating before applying the vinyl resin layer to the polyamide substrate. In this respect, treating the second coating at temperatures of up to about 350° F. for about one-half to 3 minutes has been found to produce excellent results in improved adhesion. Adhesion of the nylon to vinyl resins may be further enhanced by mixing in with the second polyimine coating an amount of a polyvinyl chloride compound.

Although the above time/temperature relationships for treating the two coatings have been found to be quite effective to provide the improved adhesion desired, these relationships could be varied outside the suggested ranges, with longer treating times employing proportionally lower temperatures, and vice versa, or a catalyst could be employed in the treating operation to increase the reaction rate, to obtain the desired substantially complete interaction between the first polyalkylenimine coating and the polyamide structure and the proper interaction between the second coating and the vinyl resin.

Various polyalkylenimine compounds may be employed in the coating operations. Polyethylenimine is presently preferred because of its commercial availability. However, other polyalkylenimines such as polymers of propylenimine, butylenimine, and others containing the recurring ethylenimine groups of a polymer molecule which characterize effective bonding agents may be used. Particularly good results have been obtained in the use of polyethylenimine compounds having molecular weights of from about 40,000 to 100,000.

By substantially fully curing the first polyimine coating on the nylon in accordance with the present invention, the imine can be interacted with the nylon to provide optimum interfacial adhesion therebetween. By thereafter providing a second application or coating of polyimine on the surface of the first coating which is only room-air dried or partially cured thereon, the second coating is firmly secured to the first coating while the face of the polyimine which is to contact the vinyl resin layer has sufficient unreacted sites available to provide optimum adhesion at the vinylimine interface, thus providing optimum bonding of the vinyl resin to the nylon in the subsequent lamination or coating operation.

The following examples illustrate a manner in which the present invention may be practiced, and percentages therein are by weight unless otherwise indicated. The examples in no way are intended to limit the scope of the invention, but are presented for purposes of illustration only.

EXAMPLE 1

A 5 oz. per sq. yd. woven fabric composed of nylon 66 yarns was padded with a 3 percent aqueous solution of PEI 600 (a polyethylenimine compound having a molecular weight of 40,000 –60,000, made by Dow Chemical Co.) to give a 1.05 percent solids pickup on the fabric.

A first sample, A, of the above fabric was heated in a forced hot-air oven at 400° F. for 1 minute and thereafter again padded with a 3 percent aqueous solution of PEI 600 to give a solids pickup of 1.03 percent PEI based on the untreated fabric weight. The thus treated fabric sample, containing a total solids pickup of 2.08 percent was then dried at room temperature.

Sample A was laminated to an 8 mil Goodyear vinyl film No. 19BB–3514. Lamination was carried out in a Pasadena hydraulic press, Model P–210, at 135 p.s.i. and 345° F. for 30 seconds. The resultant laminated fabric was tested for adhesion in accordance with Method 5970, Federal Specification CCC-T-191 b and exhibited an adhesion value of 10.9 lbs. per inch peel strength.

A second sample, B, of the above untreated fabric was padded in a single pass operation to obtain a total pickup of 2.19 percent solids PEI 600 on the fabric. The coated fabric was then heated at 400° F. for 1 minute, laminated, and tested as sample A above, and found to have an adhesion value of only 4.7 lbs. per inch peel strength.

A third sample, C, of the untreated fabric containing 2.1 percent solids PEI padded thereon was room-air dried, laminated and tested as above, with a resultant adhesion of only 7.6 lbs. per inch.

EXAMPLE 2

An untreated nylon fabric of the same construction as in example 1 was padded with a 3 percent solids aqueous solution of PEI 600 to give a 1.14 percent solids pickup on the fabric.

The coated fabric was heated in a forced hot-air oven at 400° F. for 1 minute. The fabric was then padded through an aqueous solution of 3 percent PEI 600 and 9 percent solids Geon 576 (an aqueous emulsion of preplasticized polyvinyl chloride by B. F. Goodrich) to give a solids pickup of 4.2 percent based on the weight of the untreated fabric. The doubly coated fabric was heated in a forced hot-air oven at 320° F. for 1 minute.

The fabric was laminated and tested for adhesion as in example 1. The sample exhibited an adhesion value of 22 lbs. per inch peel strength.

From the foregoing detailed explanation and illustrative examples, it can be seen that by the use of a two-pass coating operation employing a polyalkylenimine compound wherein the first pass is substantially fully reacted with the polyamide structure before application of the second coating, appreciably greater increases in adhesion values of nylon to vinyl resins may be obtained.

The foregoing specification has set forth preferred embodiments of the invention and, although specific terms have been employed, they are used in a generic and descriptive sense only and not for purposes of limitation, the scope of the invention being limited only by the extent of the following claims.

That which is claimed is:

1. A process for producing a polyamide structure having improved adhesion to vinyl resins, comprising the steps of
   a. coating a surface of the polyamide structure with a polyalkylenimine compound,
   b. treating the structure to substantially completely interact the polyalkylenimine coating with the polyamide structure,
   c. thereafter applying a liquid second coating composition comprising a polyalkylenimine compound on the coated surface of the polyamide structure, and
   d. drying the second coating to adhere it on the coated structure without appreciably reducing the availability of reactive sites therein for subsequent adhesion to vinyl resins.

2. A process as defined in claim 1 wherein the first polyalkylenimine coating is treated by heating the coated polyamide structure at a temperature from about 360° F. to 450° F. for about one-half to 3 minutes.

3. A process as defined in claim 2 wherein the second coating is treated by heating the coated structure at a temperature of up to about 350° F. for about one-half to 3 minutes.

4. A process as defined in claim 1 wherein the second polyalkylenimine coating contains a sufficient amount of a polyvinyl chloride compound mixed therein to improve subsequent adhesion of the polyamide structure to a vinyl resin.

5. A process as defined in claim 1 wherein the polyalkylenimine compound is a polyethylenimine compound.

6. A process as defined in claim 1 wherein the polyamide structure is a nylon fabric.

7. The product produced by the process of claim 6.

8. The product produced by the process of claim 1.

9. A process for forming a flexible sheet composed of a nylon fabric having a vinyl resin layer strongly adhered thereto, comprising the steps of
   a. providing a nylon fabric,
   b. applying a polyalkylenimine coating on the surface of the fabric,
   c. treating the coated fabric to substantially completely react the polyalkylenimine coating with the nylon fabric,
   d. thereafter applying a liquid second polyalkylenimine coating composition to the coated surface of the nylon,
   e. treating the thus coated fabric to at least dry the second coating composition thereon,
   f. thereafter applying a vinyl resin to the coated surface of the nylon fabric, and
   g. subsequently treating the vinyl resin and coated nylon fabric to react the polyalkylenimine and vinyl resin and firmly adhere the resin to the nylon fabric.

10. A process as defined in claim 9 wherein the second polyalkylenimine coating contains a sufficient amount of polyvinylchloride compound therein to improve the adhesion of the vinyl resin to the coated nylon fabric.

11. The product produced by the process of claim 10.

* * * * *